(12) United States Patent
Dreibholz et al.

(10) Patent No.: US 7,836,988 B2
(45) Date of Patent: Nov. 23, 2010

(54) METHOD FOR OPERATING A PARALLEL DRIVE TRAIN OF A VEHICLE

(75) Inventors: Ralf Dreibholz, Meckenbeuren (DE); Johannes Kaltenbach, Friedrichshafen (DE); Michael Gromus, Tettnang (DE); Stefan Blattner, Vogt (DE); Bernd Allgaier, Kressbronn (DE); Stefan Kilian, Friedrichshafen (DE); Peter Schiele, Kressbronn (DE); Friedrich Tenbrock, Langenargen (DE); Gerd Frotscher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 413 days.

(21) Appl. No.: 11/702,289

(22) Filed: Feb. 5, 2007

(65) Prior Publication Data

US 2008/0016599 A1  Jan. 17, 2008

(30) Foreign Application Priority Data

Feb. 7, 2006 (DE) .................. 10 2006 005 470

(51) Int. Cl.
*B60W 20/00* (2006.01)

(52) U.S. Cl. ................. 180/65.285; 180/65.25; 180/65.265

(58) Field of Classification Search .......... 180/65.25, 180/65.28, 65.285

See application file for complete search history.

(56) References Cited

U.S. PATENT DOCUMENTS

| 6,102,144 | A * | 8/2000 | Lutz .................... 180/65.25 |
| 6,232,733 | B1 * | 5/2001 | Obayashi et al. .......... 318/432 |
| 6,336,889 | B1 * | 1/2002 | Oba et al. .................... 477/5 |
| 6,510,370 | B1 * | 1/2003 | Suzuki et al. ................ 701/22 |
| 6,522,024 | B1 * | 2/2003 | Takaoka et al. .......... 290/40 C |
| 6,575,870 | B2 * | 6/2003 | Kitano et al. .................. 477/3 |
| 6,595,895 | B2 * | 7/2003 | Suzuki et al. ................. 477/3 |
| 6,784,563 | B2 * | 8/2004 | Nada ........................ 290/40 C |
| 6,785,598 | B2 | 8/2004 | Schiele |
| 6,808,470 | B2 | 10/2004 | Boll |
| 6,965,824 | B2 * | 11/2005 | Ichimoto et al. ........... 701/113 |
| 7,057,304 | B2 * | 6/2006 | Ueda ....................... 290/40 C |
| 7,223,203 | B2 * | 5/2007 | Yamazaki et al. ............ 477/15 |
| 7,275,518 | B1 * | 10/2007 | Gartner et al. ......... 123/406.23 |
| 7,313,470 | B2 * | 12/2007 | Zaremba et al. ............. 701/22 |
| 7,407,026 | B2 * | 8/2008 | Tamor .................... 180/65.28 |
| 2002/0117339 | A1 | 8/2002 | Nakashima |

(Continued)

FOREIGN PATENT DOCUMENTS

DE   195 49 081 A1   7/1997

(Continued)

*Primary Examiner*—Jeffrey J Restifo
(74) *Attorney, Agent, or Firm*—Davis & Bujold, P.L.L.C.

(57) ABSTRACT

A method for operating a parallel hybrid drive train of a vehicle having an internal combustion engine, an electric engine and an output. The electric engine being located in the power drive between the output and the internal combustion engine. A second shifting element is located between the internal combustion engine and the electric engine and a first shifting element between the electric engine and the output. Output torque driving the output can be adjusted according to the transmitting capacities of the first and second shifting elements and according to the input torque of the electric engine and/or internal combustion engine. These adjustments are corrected according to standards derived from divergences found in parameters during operation of the drive train.

10 Claims, 2 Drawing Sheets

U.S. PATENT DOCUMENTS

| | | |
|---|---|---|
| 2005/0153815 A1 | 7/2005 | Janssen |
| 2005/0155803 A1 | 7/2005 | Schiele |
| 2006/0266568 A1 | 11/2006 | Barske |

FOREIGN PATENT DOCUMENTS

| | | |
|---|---|---|
| DE | 100 26 332 A1 | 7/2001 |
| DE | 100 23 053 A1 | 12/2001 |
| DE | 100 65 760 A1 | 7/2002 |
| DE | 102 06 940 A1 | 2/2003 |
| DE | 101 58 536 A1 | 7/2003 |
| DE | 102 34 428 A1 | 2/2004 |
| DE | 103 27 306 A1 | 1/2005 |
| DE | 103 53 256 B3 | 3/2005 |
| DE | 10 2004 002 061 A1 | 8/2005 |
| DE | 10 2004 016 846 A1 | 10/2005 |
| JP | 2000-145046 A | 5/2000 |
| WO | WO-98/40647 | 9/1998 |

* cited by examiner

METHOD FOR OPERATING A PARALLEL DRIVE TRAIN OF A VEHICLE

This application claims priority from German Application Serial No. 10 2006 005 470.9 filed Feb. 7, 2006.

FIELD OF THE INVENTION

The invention concerns a method for operating a parallel drive train of a vehicle.

BACKGROUND OF THE INVENTION

Parallel hybrid drive trains, known from the practice, are designed with at least one electric engine and one output. For starting the internal combustion engine, the electric engine is situated in the power train between the output and the internal combustion engine. One frictionally engaged shifting element is respectively provided between the internal combustion engine and the electric engine and also between the electric engine and the output so that the vehicle can be operated, in different operating states, by the internal combustion engine or the electric engine. The output torque, abutting on the output of the parallel hybrid drive train, is essentially dependent on the torque produced by the electric motor and/or the internal combustion engine as well as being dependent on the transmitting capacities adjusted in the area of the shifting elements.

It is possible, for example, to disengage the internal combustion engine from the power flow of the drive train by opening the shifting element provided between the internal combustion engine and the electric engine and to drive the vehicle with adequate output torque, via a purely electromotive drive.

By placing a shifting element between the electric engine and the internal combustion engine, it is further possible to couple the disengaged internal combustion engine to the power flow of the drive train in almost all operating states of the drive train without generating reaction torques on the output that impair the riding comfort. This is attainable by adequate control and regulation of the transmitting capacity of the added shifting element, situated between the electric engine and the output.

In addition to starting the internal combustion engine, it is also possible, via an adequate slip operation of the shifting element situated between the electric engine and the internal combustion engine, to synchronize the internal combustion engine with the remaining part of a parallel hybrid drive train and couple it thereto free of reaction torques.

In addition to a vehicle designed with a parallel hybrid drive train, the conventional vehicles built with only one internal combustion engine, starting is possible only by way of the internal combustion engine. At least the shifting element located between the internal combustion engine and the electric engine or between the electric engine and the output, is slip operated and used as a starting element of the parallel hybrid drive train.

Alternative to this, it is also possible with a parallel hybrid drive train, during a starting process, to drive a vehicle simultaneously, via the electric engine and via the internal combustion engine, with at least one slipping shifting element. It is possible to convey in the direction of the output the input torque of the electric engine both in a slipping and in an engaged state of the shifting element between the electric engine and the output.

With a driving process joined together with the starting process of the vehicle, a parallel hybrid drive train can operate in a manner such that its output torque, preset by the driver, couples with the output of the vehicle and while driving, an energy accumulator of the vehicle, as a result of the electric engine acting as a generator, is unloaded or is loaded.

Moreover, an electric energy accumulator of the vehicle can be neutrally loaded while the electric engine is in a driving position by engaging the shifting element, located between the electric engine and the output; the same as by engaging the shifting element located between the electric engine and the internal combustion engine.

To be able to ensure increased riding comfort during the above described operation cycle, the input torques of the electric engine and the internal combustion engine to be adjusted depend on the operating state and/or the driver's desire, the same as the transmitting capacities to be adjusted in the range of the shifting elements depend on the operating state and/or on the driver's desire, have to be exactly coordinated with each other. Manufacture tolerances, determined by production, and by operation characteristics of the components, change over the service life of the components of the parallel hybrid drive train, on one hand, resulting in an operating characteristic differing from system to system. Operational characteristics of the components also change with the increasing duration of operation or service life of the components decreasing, resulting in an undesired diminishment of riding comfort.

Therefore, the problem on which this invention is based is to make a method available for operating a parallel hybrid drive train of a vehicle which, in the operation of a parallel hybrid drive train, the reduction of riding comfort is easily prevented.

SUMMARY OF THE INVENTION

In the inventive method of operating a parallel hybrid drive train of a vehicle, having one internal combustion engine, one electric engine and one output. The electric engine is situated in the power train between the output and the internal combustion engine and in which a frictionally engaged shifting element is respectively provided between the internal combustion engine and the output engine. A nominal output torque driving the output can be adjusted depending on the transmitting capacity of the first shifting element situated between the electric engine and the output; the transmitting capacity of the second shifting element situated between the electric engine and the internal combustion engine; the output torque of the electric engine, and/or the input torque of the internal combustion engine.

According to the invention, nominal standards for adjusting the transmitting capacity of the shifting elements and/or the parallel hybrid drive train of the internal combustion engine are corrected according to divergences, found during operation of the parallel hybrid drive train between determined operation parameters of the drive train, thus reducing the divergences when at most two of the components of the parallel hybrid drive train that affect the output torque abutting on the output are operated under regulation.

It is thus easily possible to execute different operation state curves of a parallel hybrid drive train during operation of the vehicle in order to change and adapt preset nominal standards thus achieving greater riding comfort.

In an advantageous alternative of the inventive method, it is provided to determine the divergences between actual values of operating parameters of the parallel hybrid drive train and then correct the nominal standards according to these divergences.

In addition to or alternative to this, in other advantageous variations of the inventive method are provided to find the divergences between actual values of the operational parameters of the parallel hybrid drive train and, via a model, theoretically reproducing the parallel hybrid drive train in the operation of a vehicle to mathematically determine operation parameters of the parallel hybrid drive train and correct the nominal standards according to the divergences thus determined.

In addition or alternative to both above mentioned variations of the inventive method, in other advantageous developments of the inventive method divergences are found according to an evaluation of divergences of regulations of the components of the parallel hybrid drive affecting the output torque in the actually observed operation point of the parallel hybrid drive train and the nominal standards, are corrected according to the divergences thus determined.

BRIEF DESCRIPTION OF THE DRAWING

The invention will now be described, by way of example, with reference to the accompanying drawing in which.

DETAILED DESCRIPTION OF THE INVENTION

Figure 1:
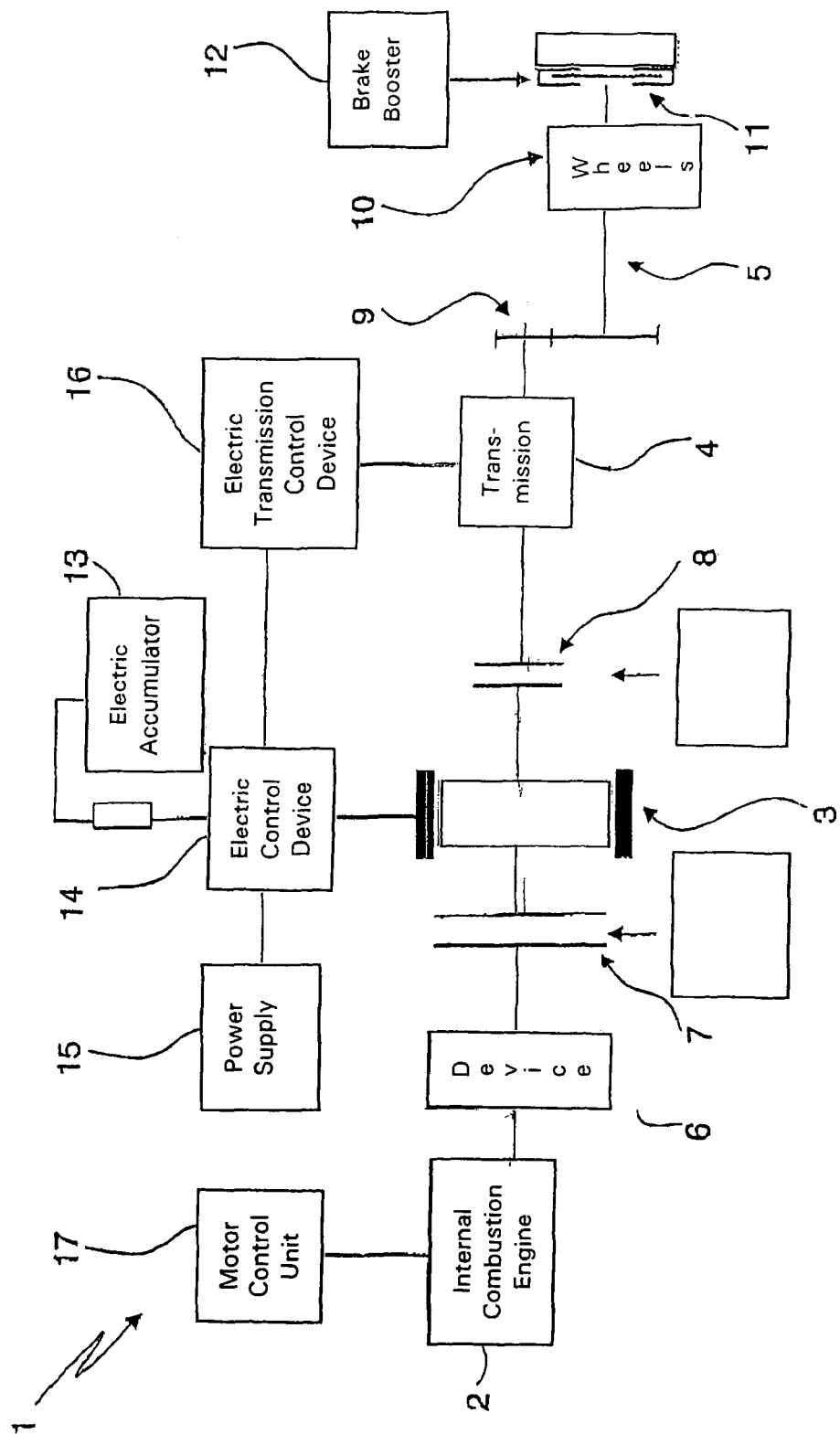
FIG. 1 is a schematized representation of a parallel hybrid drive train, operated according to the invention.

FIG. 1 shows a parallel hybrid drive train 1 of a vehicle in extensively schematized representation in the form of a block gearshift pattern. The parallel hybrid drive train 1 comprises one internal combustion engine 2, one electric engine 3, one transmission 4 and one output 5. Between the internal combustion engine 2 and the electric engine 3, one device 6 and one frictionally engaged shifting element 7 are located for damping rotational irregularities.

By way of shifting element 7, an operative connection can be created between the internal combustion engine 2 and the electric engine 3 so as to make executing different operation states of the parallel hybrid drive train 1 of the vehicle possible, such as a motion exclusively via the electric engine 3; a parallel motion via the internal combustion engine 2 and the electric engine 3; or a motion exclusively via the internal combustion engine 2.

By placing the shifting element 7 between the internal combustion engine 2 and the electric engine 3, it is further possible, when the rotation drive of the electric engine 3 is required for starting the internal combustion engine 2, to couple the internal combustion engine 2 via the shifting element 7 with the electric engine 3 so that the internal combustion engine 2 is started by the electric engine 3.

Additionally, between the electric engine 3 and the transmission 4, which is situated on the side of the electric engine 3 remote from the internal combustion engine 2, one other shifting element 8 with continuously variable transmitting capacity is situated by way of which the electric engine 3 can be coupled with the transmission 4 and the output 5. The transmission 4 is designed as a conventional automatic transmission where different ratios can be produced. However, the transmission can be any transmission, known per se from the practice, which can be combined both with an integrated starting clutch and with a separate starting element, such as an unused frictionally engaged clutch, to produce a ratio in the automatic transmission.

Upon the side remote from the other shifting element 8 or on the output side, the transmission 4 is coupled via an axle differential 9 with wheels 10 of a vehicle drive axle of the parallel hybrid drive train 1. A part of a brake system 11 is shown in the area of the wheels 10, and features a so-called brake booster 12. The brake booster 12 constitutes a device by way of which, in the coasting operation of the parallel hybrid drive train 11, the brake system is automatically actuated to produce a counter-coasting torque on the output 5 when an electric accumulator 13, coordinated with the electric engine 3, is fully loaded by the generator operated electric engine 3. The electric engine 3 cannot produce any sufficient motor braking torque on the output 5. The electric accumulator 13 is connected, via an electric control 14, with the electric engine 3, a power supply 15 and an electric transmission control device 16. The last mentioned transmission control device 16 is provided for control of the transmission 4. A motor control unit 17 is provided for control of the internal combustion engine 2.

To be able to operate the parallel hybrid drive train 1 in a manner that diminishes the riding comfort only very slightly or not at all, during a synchronizing and coupling process of the internal combustion engine 2, a pure starting process on the side of the internal combustion engine 2 with simultaneously slipping shifting element 7 and/or 8, a combined starting process on the side of the electric and internal combustion engines with simultaneous slipping shifting element 7 and/or 8, a hybrid drive operation and simultaneous loading and unloading process of the electric accumulator 13, or during a loading process of the electric accumulator 13 in neutral drive position, the input torques respectively acting via the internal combustion engine 2 and/or the electric engine 3 in the parallel hybrid drive train 1, the same as the transmitting capacity adjusted in the area of the shifting elements 7 and 8, are exactly coordinated with each other over the whole service life of the parallel hybrid drive train by the inventive method described herebelow.

Figure 2:
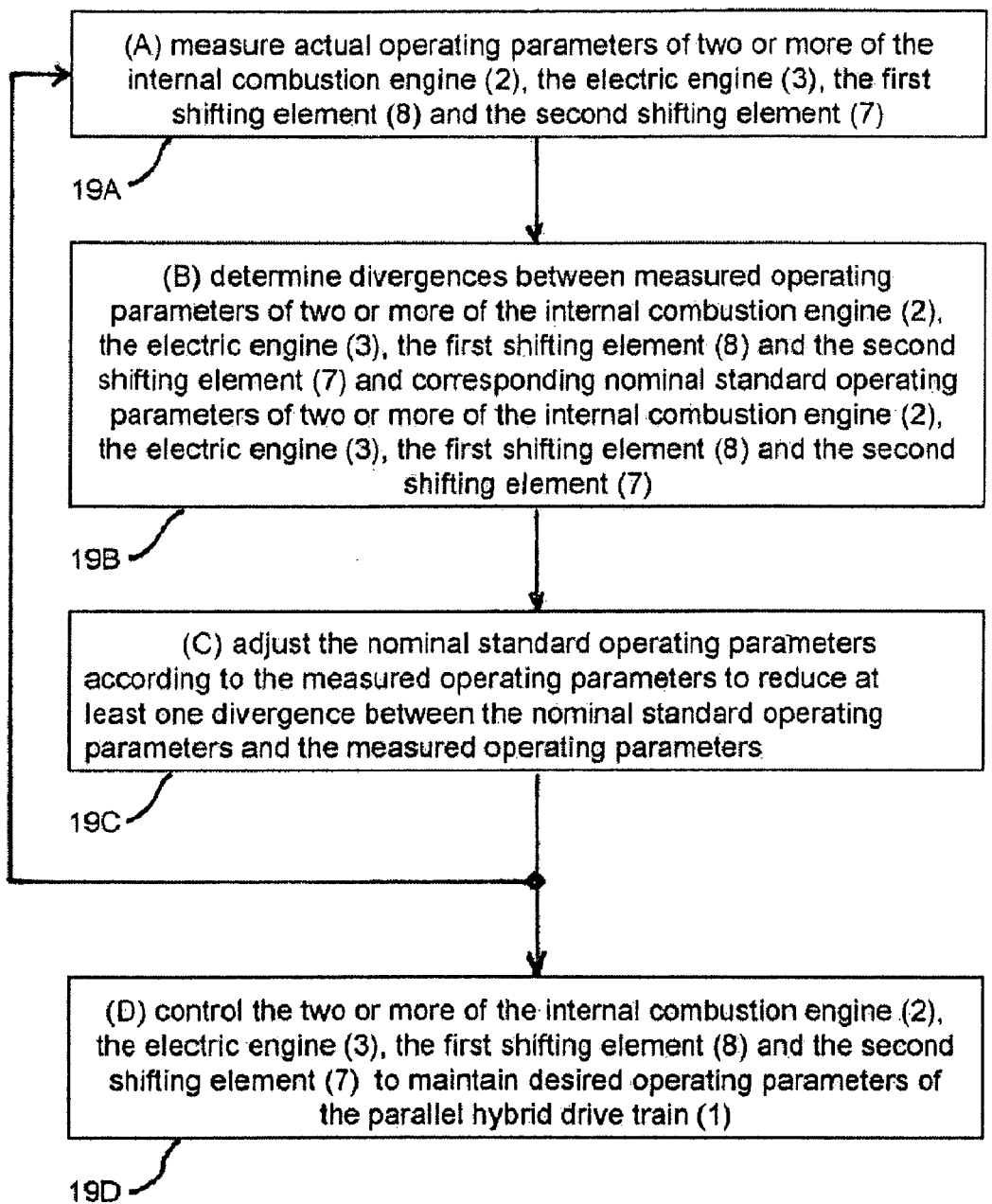
FIG. 2 is flow chart illustrating the method of the present invention.

At the same time, and as illustrated in Steps 19A-19D of FIG. 2, during certain operative phases of the parallel hybrid drive train 1 during which only two components or assemblies of the parallel hybrid drive train regulate output torque driving the output 4, and correspond to the above mentioned operation curves basis of the operation cycles of the parallel hybrid drive train, among others to nominal standards for adjustment of the input torque of the internal combustion engine 2 and of the electric engine 3. Similar to transmitting capacities or equivalent to hydraulic control pressures of the hydraulically actuatable shifting elements 7 and 8, correction values are determined for the nominal standards depending on the extent of error of operating state magnitudes or operating state parameters of the parallel hybrid train 1 adequate for the operation state curve observed. The nominal standards for adjusting the transmitting capacity of the shifting elements 7, 8 and the input torques of the internal combustion engine 2 and of the electric engine 3 are adjusted by the correction values so that the characteristics of the individual assemblies of the parallel hybrid drive train 1 are coordinated with each other to achieve increased riding comfort.

The balance or the calibration of the operation characteristics of the individual assemblies of the parallel hybrid train 1, relative to each other, can also be achieved when, in addition, to two assemblies of the parallel hybrid drive train 1 which can alter the output torque driving the output, one other assembly is engaged whose operating characteristic likewise influence the output torque driving the output when, at least in the area of one of the two prior engaged assemblies, no change of control results.

The magnitude of error, used to calculate the correction values, can be determined from differences between actual values of the operating parameters of the parallel hybrid drive train and theoretically determined values of the operating parameters of the parallel hybrid drive train 1 which can be calculated via a theoretical model-like reproduction of the system of the parallel hybrid drive train 1 and/or, according to evaluation of the differences, in regulating the assemblies of the parallel hybrid drive train 1 effecting the output torque driving on the output.

The nominal standard of an assembly of the parallel hybrid drive train 1 is corrected and facilitates adjusting a desired output torque. The momentary greater irregularity is expected to call within the scope of the nominal standards in relation to the actually observed operating point of the parallel hybrid drive train 1, when compared to other assemblies of the parallel hybrid drive train engaged in the power flow of the parallel hybrid drive train 1. Affecting the output torque, the respective other assemblies of the parallel hybrid drive train 1 deliver the reference magnitudes or the reference magnitudes for adaptation or calibration of the nominal standard.

At the same time, as the duration of operation of the shifting elements increases, there appears an increase of wear of the friction surfaces in the area of the shifting elements 7 and 8 which are designed as frictionally engaged clutches, such that the shifting elements have to be controlled with stronger pressure to achieve the same transmitting capacity as their duration of operation increases or their service life decreases.

The torque generated by the internal combustion engine 2 is further known to decrease with the same nominal standard as the service life of the internal combustion engine 2 decreases, since the transmitting capacity of the internal combustion engine 2 decreases as a result of wear and tear.

Contrary to this, as a result of the almost wear-free operation over the service life of the parallel hybrid drive train 1, the transmitting capacity of the electric engine 3 remains essentially constant such that the nominal standards of the different assemblies of the parallel hybrid power train 1, i.e., of the shifting elements 7 and 8 and those of the internal combustion engine 2 of the parallel hybrid drive train 1 can be coordinated, with the aid of the electric engine 3, during different phases of operation of the parallel hybrid drive train 1 in which the electric engine 3, the shifting elements 7 or 8 and the internal combustion engine 2 are engaged in the power flow of the parallel hybrid drive train 1 as added assemblies that determine the output torque driving on the output.

Thus, for example, during a normal driving operation of the vehicle, while both shifting elements 7 and 8 are fully engaged, the nominal standard for adjustment of a desired input torque of the internal combustion engine 2 can be adjusted according to the torque generated by the electric engine 3 when operating the motor or generator.

The nominal standard of the input torque of the internal combustion engine 2 can also be considered in a pure loading operation of the electric accumulator 13, via the electric engine 3, when the other shifting element 8, with which the electric engine 3 and the internal combustion engine can be coupled with the output 5 of the parallel hybrid drive train 1, is fully disengaged.

The nominal standard for adjustment of the transmitting capacity of the first shifting element 7 or the other shifting element 8 can be balanced when the vehicle is parked during which the actuated brake system 11 of the parallel hybrid drive train restricts the input torque of the electric engine 3 or the input torque of the internal combustion engine 2. In addition, the nominal standard for adjustment of the transmitting capacity of the first shifting element 7 experiencing constant slip during slip regulated operation can be balanced via the input torque actually generated by the electric engine 3.

The adequate magnitude of error, according to which correction values, are determined for balancing the nominal standards for adjusting the transmitting capacity of the shifting elements 7 and 8 and/or the input torque of the internal combustion engine 2, do not represent, for example, demanded accelerations or rotational speed changes in the parallel hybrid drive train 1 which are not to be expected as a result of the actually generated nominal standards of the components of the parallel hybrid drive train 1 that affect the output torque.

To eliminate any eventually determined divergences, the nominal standards are multiplied by correction values determined by calibration or determined during operation of the parallel hybrid drive train via corresponding adaptation routines, thereby changing the operation of the drive train to minimize the divergences.

Alternative to or combined with the above described correction of the nominal standards, via the correction values, it is also possible to adapt the nominal standards by offset values determined by calibration or determined via positive or negative adaptation routines to change the nominal standards in the way desired.

With the above described inventive method, it is easily possible to coordinate the input torques applied by an internal combustion engine and one or more electric machines, the transmitting capacities of shifting elements, and the transmitting capacities of transmission and vehicle brakes, in such a manner that a vehicle designed with a parallel hybrid drive train can be operated with increased riding comfort by eliminating changes in the operating characteristics of individual assemblies of the parallel hybrid drive train, which were caused by production influences and by service life, and by balancing, at low control and regulation expense, divergences appearing during operation of the vehicle and caused by external influences.

REFERENCE NUMERALS

1 parallel hybrid drive train
2 internal combustion engine
3 electric engine
4 transmission
5 output
6 device for damping rotation irregularities
7 second shifting element
8 first shifting element
9 axle differential
10 wheels
11 brake system
12 brake booster
13 electric accumulator
14 electric control device
15 power supply
16 electric transmission control device
17 motor control unit

The invention claimed is:

1. A method of operating a parallel hybrid drive train (1) of a vehicle having an internal combustion engine (2), an electric engine (3) and a drive train output (5), wherein the electric engine (3) is situated in a power flow path between the drive train output (5) and the internal combustion engine (2), a first shifting element (8) is located between the electric engine (3) and the output (5), and a second shifting element (7) is located between the internal combustion engine (2) and the electric engine (3), and operation of the internal combustion engine (2), the electric engine (3), the first shifting element (8) and the second shifting element (7) are controlled according to nominal standard operating parameters, which are adjusted to compensate for changes of operation over a service life of the internal combustion engine (2), the electric engine (3), the first shifting element (8) and the second shifting element (7), the method comprising the steps of:
- (A) measuring actual operating parameters of at least two of the internal combustion engine (2), the electric engine (3), the first shifting element (8) and the second shifting element (7), including
  - measuring, as the operating parameters; actual transmission capacities of each of the first shifting element (8) and the second shifting element (7); and
  - determining divergences between the actual transmission capacities of each of the first shifting element (8) and the second shifting element (7) and corresponding nominal standard operating parameters of each of the first shifting element (8) and the second shifting element (7),
- (B) determining divergences between measured operating parameters of at least two of the internal combustion engine (2), the electric engine (3), the first shifting element (8) and the second shifting element (7) and corresponding nominal standard operating parameters of at least two of the internal combustion engine (2), the electric engine (3), the first shifting element (8) and the second shifting element (7),
- (C) adjusting the nominal standard operating parameters according to the measured operating parameters to reduce at least one divergence between the nominal standard operating parameters and the measured operating parameters, and
- (D) controlling the at least two the internal combustion engine (2), the electric engine (3), the first shifting element (8) and the second shifting element (7) to maintain desired operating parameters of the parallel hybrid drive train (1).

2. The method according to claim 1, further comprising the step of determining the divergences according to an evaluation of the divergences from the regulations of the at least two of the internal combustion engine (2), the electric engine (3), the first shifting element (8) and the second shifting element (7) of the parallel hybrid drive train (1) that actually affect the input torques from the electric engine (3) and the internal combustion engine (2).

3. The method according to claim 1, further comprising the steps of:
  - correcting the nominal standard of each of the at least two of the internal combustion engine (2), the electric engine (3), the first shifting element (8) and the second shifting element (7) of the parallel hybrid drive train (1); and
  - adjusting an output torque driving the output (5) according to the corrected nominal standard of each of the at least two of the internal combustion engine (2), the electric engine (3), the first shifting element (8) and the second shifting element (7), based on the operating parameters of the parallel hybrid drive train (1);
  - within a range of the corrected nominal standard of the at least two of the internal combustion engine (2), the electric engine (3), the first shifting element (8) and the second shifting element (7), a divergence between an actual operating characteristic and an expected operating characteristic is greater than the divergence of the at least two of the internal combustion engine (2), the electric engine (3), the first shifting element (8) and the second shifting element (7) of the parallel hybrid drive train (1).

4. The method according to claim 1, further comprising the step of correcting the nominal standards of each of the at least two of the internal combustion engine (2), the electric engine (3), the first shifting element (8) and the second shifting element (7) of the parallel hybrid drive train (1) that simultaneously adjust the output torque driving the output (5) during regulated operation.

5. The method according to claim 1, further comprising the step of the correcting the nominal standard by multiplying the nominal standard by a correction factor.

6. The method according to claim 1, further comprising the step of the correcting the nominal standard by adding an offset value thereto.

7. The method according to claim 1, further comprising the step of balancing the nominal standard of the input torque from the internal combustion engine (2) via the input torque from the electric engine (3), when the first and the second shifting elements (7, 8) are engaged.

8. The method according to claim 1, further comprising the step of balancing the nominal standard of the input torque from the internal combustion engine (2) while the electric engine (3) is operating as a regulated generator, when the first shifting element (8) is disengaged and the second shifting element (7) is engaged.

9. The method according to claim 1, further comprising the step of balancing the nominal standard of the transmitting capacity of the first shifting element (8) via one of the input torque from the electric engine (3) or the input torque from the internal combustion engine (2) while the vehicle is in a parked stated with a vehicle brake (11) engaged.

10. The method of operating a parallel hybrid drive train (1) of claim 1, further comprising the step of basing the nominal standard operating parameters on a model of the parallel hybrid drive train (1), and
  - adjusting the nominal standard operating parameters so that the combination of adjusted nominal standard operating parameters maintains the desired operating parameters of the parallel hybrid drive train as represented by the model of the parallel hybrid drive train.

* * * * *